United States Patent [19]

Takada et al.

[11] Patent Number: 4,849,398

[45] Date of Patent: Jul. 18, 1989

[54] CATALYST FOR PURIFYING EXHAUST GASES

[75] Inventors: Toshihiro Takada, Toyota; Shinichi Matsumoto, Aichi; Naoto Miyoshi, Nagoya, all of Japan

[73] Assignee: Toyota Jidosha Kabushiki Kaisha, JPX

[21] Appl. No.: 82,533

[22] Filed: Aug. 7, 1987

[30] Foreign Application Priority Data

Sep. 17, 1986 [JP] Japan ................................. 61-218765

[51] Int. Cl.$^4$ ........................ B01J 23/02; B01J 23/10; B01J 23/38
[52] U.S. Cl. .................................... 502/303; 502/525; 423/213.5
[58] Field of Search .............................. 502/303, 525; 423/213.5

[56] References Cited

U.S. PATENT DOCUMENTS 3,905,918  9/1975  Mai et al. .................. 502/525 X
4,237,032  12/1980  Evans et al. ................ 502/525 X

FOREIGN PATENT DOCUMENTS 2526385  10/1978  Fed. Rep. of Germany .

*Primary Examiner*—W. J. Shine
*Attorney, Agent, or Firm*—Finnegan, Henderson, Farabow, Garrett & Dunner

[57] ABSTRACT

A catalyst for purifying exhaust gases contains: a catalyst support, a perovskite double oxide comprising at least one alkaline earth metal oxide, lathanum oxide and cerium oxide, carried on the catalyst support, and noble metal catalyst components carried on the catalyst support.

The catalyst for purifying exhaust gases according to the present invention offers an improved durability and purifying ratios for carbon monoxide CO, hydrocarbons HC and nitrogen oxides NOx.

9 Claims, 2 Drawing Sheets

CATALYST FOR PURIFYING EXHAUST GASES

BACKGROUND OF THE INVENTION

1. Field of the Invention

The present invention relates to a catalyst for purifying exhaust gases.

2. Description of the Prior Art

It is known from the U.S. Pat. No. 3,565,830 that a catalyst support for purifying exhaust gases can be modified to a better catalyst support by forming activated alumina coating layer on the catalyst support.

Further, it is known from Japanese Patent Laid-open Publications No. 63133/1982 that a catalyst for purifying exhaust gases comprising an inorganic porous support on which double oxide of cerium (Ce) and lanthanum (La) is formed, and further on which elements of the platinum group are carried on the double oxide.

The latter catalyst of aforesaid prior arts is intended to improve the exhaust gas purification ratio and the durability by enhancing the $O_2$ (oxygen) storage effect and enlarging window. The window means a characteristic specifying a tolerance range of an excess air ratio (1/R) expressed in the following equation:

Excess air ratio $(1/R) = O_o/O_R$ where $O_R$: required oxygen amount for oxidizing all reduction compositions into water ($H_2O$) and carbon dioxide ($CO_2$)

$O_o$: suppliable oxygen amount in oxidation compositions

The large window means that the tolerance range is wide. The exhaust gas purification ratio and the durability of the catalyst has been improved compared with a catalyst comprising cerium oxide alone.

However, it is desired that a catalyst decreases harmful components of exhaust gases such as hydrocarbons HC, carbon monoxide CO and nitrogen oxides NO to zero and that a catalyst should have a superior durability in view of the resource saving and the cost reduction requirements. Therefore, it has been required to develop a catalyst having superior exhaust gas purifying property and durability to aforesaid catalysts.

SUMMARY OF THE INVENTION

This invention has been achieved in view of aforesaid requirements. It is an object of the present invention to provide a better catalyst for purifying exhaust gases in the exhaust gas purifying property and the heat resistance.

The catalyst of the present invention for purifying exhaust gases contains a catalyst support, perovskite double oxide composing of oxide of at least one of alkaline earth metal, lanthanum oxide and cerium oxide, and noble metal catalyst components carried on said catalyst support. Here, perovskite double oxide generally means double oxide having a perovskite structure which is one type of crystal structure of double oxide and expressed by chemical formula, $RMX_3$. The perovskite structure belongs to cubic system in ideal crystal and includes one chemical unit, $RMX_3$, in a unit cell. That is, R forms a simple cubic lattice, M positions at the center of body, and X position at the centers of the faces. However, few perovskite double oxides belong to cubic system in ideal crystal and most perovskite double oxides belong to tetragonal, monoclinic, rhombic or hexagonal system, in strained crystal.

DETAILED DESCRIPTION OF THE INVENTION

Figure 1:
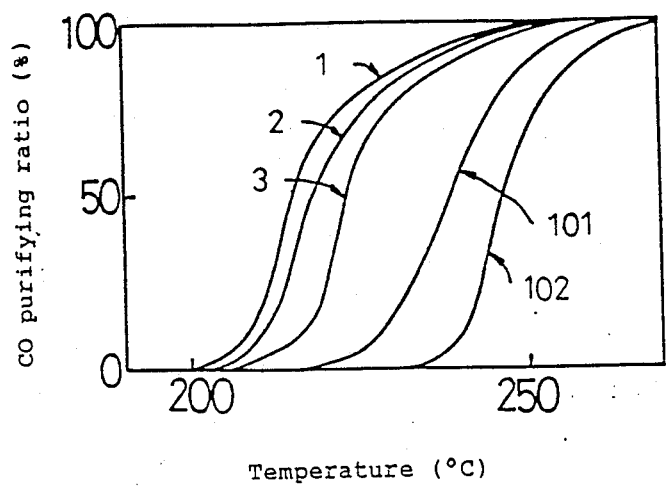
FIG. 1 is a graph showing temperature characteristics of carbon monoxide (CO) purifying ratios displayed by catalysts of examples embodying the present invention, and comparative examples.

No special configuration is required for the catalyst support used in the present invention. The granulated, pelletted, or honeycomb-shaped or foamed monolithic catalyst support is usually used. Here, the monolithic catalyst support has a gas inlet opening at one end and a gas outlet opening at the other end, and many pores are formed in the catalyst support. And for the substrate, cordierite, mullite, alumina or activated alumina, which is used for applications of this type, can be used.

The aforesaid perovskite double oxide means double oxide comprising oxide of at least one alkaline earth metal, lanthanum oxide and cerium oxide. It is expressed by a chemical formula, $M(II)_{1-x}La_xCeO_{3-\delta}$ ($0 < x < 1$), and more preferably a double oxide having the value x in the range, $0 < x \leq \frac{2}{3}$. Here, delta is the oxygen deficiency amount, and can be expressed by a formula, $\delta = (x/2) + \delta'$. In the formula, $\delta'$ is the oxygen deficiency amount due to the oxidation-reduction of cerium. In the catalyst of the present invention, oxides may contain at least the perovskite double oxide composing of oxide of at least one alkaline earth metal, lanthanum oxide and cerium oxide. Therefore, one alkaline earth metal oxide, lanthanum oxide and cerium oxide may be also contained in the oxides. Further, any double oxides composed of any two alkaline earth metal oxides, lanthanum oxide and cerium oxide may be contained in the oxides. Here, the alkaline earth metals mean magnesium (Mg), calcium (Ca), strontium (Sr), barium (Ba) and so on. Barium (Ba) with a stronger basicity is preferred among them.

The perovskite double oxide may take a form of double oxide after calcination. Metal materials which can be oxidized into the perovskite double oxide may be used. For instance, nitrates of the metals, carbonates of the metals or oxides of the metals and the like may be used.

The double oxide used in the present invention will be coated on the surface of a support substrate or the surface of substrate cells by a conventional method after adding the double oxide preferably with the grain diameter of 5 to 30 micrometer, which has been formed into double oxide beforehand, to the slurry of activated ceramics such as activated alumina with the same grain diameter. The double oxide may be formed on the support by calcination after impregnating the water soluble salts of the metals into the support in the predetermined stoichiometry ratio.

The adding amount of the double oxide to the activated ceramics is 0.5 to 100% by weight, more preferably, it is 5 to 45% by weight.

Aforesaid noble metal catalyst components are gold (Au) and silver (Ag), and more specifically it is one of platinum group metal such as platinum (Pt), palladium (Pd), rhodium (Rh) and iridium (Ir) and so on. It is preferred to use one element or more of platinum group metal as the catalyst components of the present invention. It is especially preferred to combine at least two elements of platinum (Pt), palladium (Pd) and rhodium (Rh). The catalyst components will be used within the normal amount.

When forming a layer containing the double oxide and the noble metal catalyst components, especially when forming the layer on a substrate made of materials like cordierite, mullite and alumina which do not let the double oxide and the noble metal catalyst components fully exhibit their catalyst activities, the double oxide and the noble metal catalyst components may be contained in a layer of a material such as an activated alumina like $\gamma$-alumina, which has been known to let the double oxide and the noble metal catalyst fully exhibit their catalyst activities or an adsorbent active material.

The catalyst of the present invention for purifying exhaust gases comprises a catalyst support, perovskite double oxide composed of an oxide of at least one alkaline earth metal, lanthanum oxide, and cerium oxide and noble metal catalyst components carried on aforesaid catalyst support.

The perovskite double oxide is stable against heat. Hence, the catalyst of the present invention is superior in durability because of the superior heat resistance.

The perovskite double oxide in the catalyst of the present invention is formed by adding lanthanum (La), barium (Ba) and so on to cerium (Ce) having $O_2$ (oxygen) storage effect. Therefore, the catalyst of the present invention can show the $O_2$ (oxygen) storage effect even in a higher temperature range because the perovskite double oxide is stable against heat. Accordingly, the catalyst of the present invention can prevent the thermal degradation of the noble metal catalyst components effectively because the perovskite double oxide has a special oxidation-reduction effect as well as the $O_2$ (oxygen) storage effect.

The $O_2$ (oxygen) storage effect and the noble metal dispersion effect of cerium (Ce) and lanthanum (La) can be preserved as they are because the catalyst of the present invention comprises cerium (Ce) and lanthanum (La) in the form of the perovskite double oxide. Further, in the catalyst of the present invention noble metal complex ions are adsorbed strongly in the noble metal carrying process because the catalyst of the present invention comprises lanthanum (La) and barium (Ba) with a stronger basicity. Accordingly, in the catalyst of the present invention, the noble metal catalyst components are carried on the substrate surface in a highly dispersed state. Barium (Ba) having a stronger basicity among alkaline earth metals is preferred to attain the dispersion effect.

The catalyst formed as mentioned above has a remarkably improved durability and purifying ratios of carbon monoxide CO, hydrocarbons HC and nitrogen oxides NOx.

As disclosed in Japanese Patent Laid-Open Publication No. 87839/1982, perovskite double oxide will not be formed only by adding lanthanum (La) and cerium (Ce). However, when barium and the like is further added, perovskite double oxide is formed. And when an activated alumina layer like $\gamma$-alumina layer is formed on the catalyst support and the predetermined perovskite double oxide is formed in the activated alumina layer, the surface of the activated alumina is coated with perovskite double oxide having a superior heat resistance property. Thus, in the catalyst of the present invention, the thermal degradation or sintering of activated alumina, which propagates through surface dispersion, can be prevented thoroughly from occuring.

The following concrete examples are given to illustrate the present invention in more detail.

(Preparation of catalyst)

Example 1

Three hundreds (300) grams of distilled water, 1000 grams of alumina powder and 700 grams of alumina sol containing 10% of alumina by weight were mixed together. The mixture was stirred to make slurry. A monolithic catalyst support made of cordierite was immersed into the slurry for 1 minute. After taken out of the slurry, the monolithic catalyst support substrate was subjected to an air jet for blowing off the excess slurry in the cells. Then, the monolithic catalyst support substrate was dried at 150° C. for 1 hour, and calcinated at 700° C. for 2 hours. The operations described above were repeated two times. Thus, $\gamma$-alumina layer was formed over the monolithic support substrate.

Next, barium nitrate, lanthanum nitrate and cerium nitrate were mixed in the composition ratio as listed in the table, and distilled water was added to make a water solution. The monolithic catalyst support substrate over which the $\gamma$-alumina layer was formed was immersed into the water solution. After taken out of the water solution, the monolithic catalyst support substrate was subjected to an air jet for blowing off the excessibe water solution. Then, the monolithic catalyst support substrate was dried at 150° C. for 1 hour, and calcinated at 700° C. for 2 hours. Thus, the perovskite double oxide $Ba_{1-x}La_xCeO_{3-\delta}$ was formed in the $\gamma$-alumina layer.

After the perovskite double oxide formation, the monolithic catalyst support substrate was immersed in dinitrodiamine platinum water solution for 1 hour. After taken out of the solution, the monolithic catalyst support substrate was dried at 150° C. for 1 hour to have platinum (Pt) carried in the $\gamma$-alumina layer in the ratio as listed in the table. Then, the monolithic catalyst support substrate was immersed into palladium chloride water solution for 1 hour. After taken out of the solution, the monolithic catalyst support substrate was dried at 150° C. for 1 hour to have palladium (Pd) carried in the $\gamma$-alumina layer in the ratio as listed in the table to prepare a catalyst of example 1.

Example 2

A catalyst of example 2 with the composition ratio as listed in the table was obtained by the same operations for preparing test example 1. In example 2, the ratio of cerium (Ce) carried in the $\gamma$-alumina layer on the monolithic catalyst support substrate was 1.5 mole per 1 liter volume of the catalyst obtained. The catalyst of example 2 carries more cerium (Ce) than example 1 by 0.5 mole.

Example 3

A catalyst of example 3 with the composition ratio as listed in the table was obtained by the same operations for preparing example 1. In example 3, the ratio of lanthanum (La) carried in the γ-alumina layer on the monolithic catalyst support substrate was 0.75 mole per 1 liter volume of the catalyst obtained. The catalyst of example 3 carries more lanthanum (La) than example 1 by 0.5 mole.

Comparative Example 101

A catalyst of comparative example 101 with the composition ratio as listed in the table was obtained by the same operations for preparing example 1. The catalyst of comparative example 1 did not contain barium (Ba) because a metal nitrate water solution containing lanthanum nitrate and cerium nitrate mixed in 1:1 molar ratio but not containing barium nitrate was used when having lanthanum and cerium carried in the γ-alumina layer on the monolithic catalyst support substrate.

Comparative Example 102

A catalyst of comparative example 102 with the composition ratio as listed in the table was obtained by the same operations for preparing example 1. The catalyst of comparative example 102 did not contain cerium (Ce) and lanthanum (La).

TABLE

|  | Ba | La | Ce | Pt | Pd |
|---|---|---|---|---|---|
|  | (mol/l-cat.) | | | (g/l-cat.) | |
| Example 1 | 0.75 | 0.25 | 1.0 | 0.5 | 0.5 |
| Example 2 | 0.75 | 0.25 | 1.5 | 0.5 | 0.5 |
| Example 3 | 0.75 | 0.75 | 1.0 | 0.5 | 0.5 |
| Comparative Example 101 | 0.0 | 1.0 | 1.0 | 0.5 | 0.5 |
| Comparative Example 102 | 1.0 | 0.0 | 0.0 | 0.5 | 0.5 |

The table describes the components and ratios of the catalysts of examples 1 to 3 and comparative examples 101 and 102. The composition listed for example 1 is the case of catalyst expressed by a chemical formula $Ba_{1-x}La_xCeO_{3-\delta}$ in which the value x is $\frac{1}{4}$. The catalysts listed in the table are synthesized so as to have a chemical formula $Ba_{1-x}La_xCe_{3-\delta}$ in which the value x falls in the range, $0 \leq x < \frac{3}{4}$.

(Property Evaluation on the Catalysts)

These 5 catalysts of test and comparative examples were subjected to the following durability test, and their exhaust gas purifying performances were evaluated.

In the durability test, the catalysts were mounted on an exhaust system of a 2800 cc engine with 6-cylinder. The durability test condition was conducted under the following condition.

| Air-fuel ratio (A/F) | approximately 16.0 |
| Space velocity (SV) | 60000 hr$^{-1}$ |
| Catalyst bed temperature | 850° C. |

In the exhaust gas purifying performance test, the following composition of a gaseous mixture was used, and the gaseous mixture was supplied to the catalysts, and their carbon monoxide, hydrocarbons, and nitrogen oxides purifying ratios were measured under the space velocity (SV) condition of 56750 hr$^{-1}$.

CO: 2%
$C_3H_8$: 200 ppm
$O_2$: 2%
$CO_2$: 10%
$H_2O$: 10%
$N_2$: balance

Figure 2:
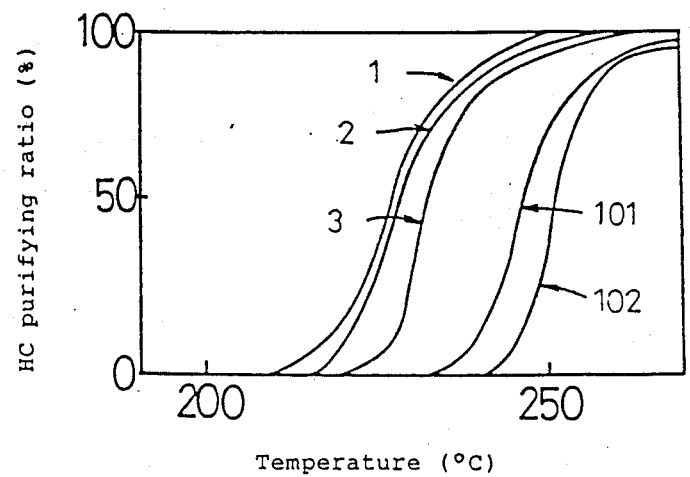
FIG. 2 is a graph showing temperature characteristics of hydrocarbons (HC) purifying ratios displayed by catalysts of examples embodying the present invention, and comparative examples.
Figure 3:
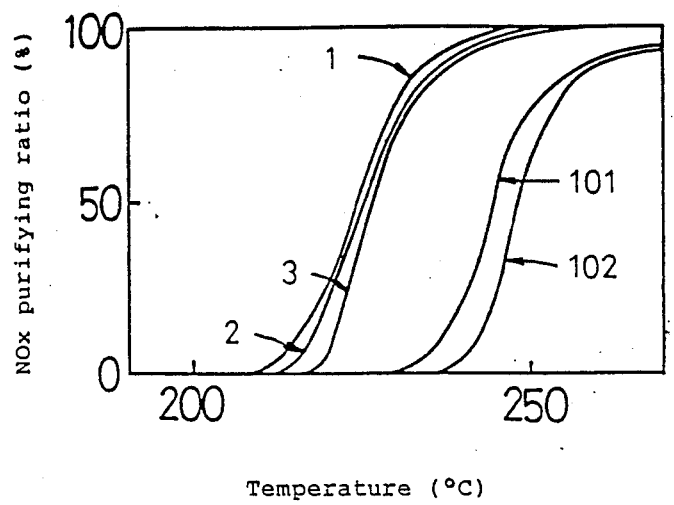
FIG. 3 is a graph showing temperature characteristics of nitrogen oxides (NOx) purifying ratios displayed by catalysts of examples embodying the present invention, and comparative examples.

The results of these tests are shown in FIGS. 1, 2, and 3.

Example 1 is much more active than example 2, in which cerium (Ce) having a high oxygen ($O_2$) storage effect is added in addition to the perovskite double oxide, and example 3, in which lanthanum (La) having a high alumina stabilizing effect is added in addition to the perovskite double oxide. The results show that it is important to form the pervoskite double oxide containing barium (Ba), lanthanum (La) and cerium (Ce). Example 1 is highly activated because the effect of the perovskite double oxide formation has been fully exhibited.

What is claimed is:

1. A catalyst for purifying exhaust gases containing:
    a catalyst support;
    a pervoskite double oxide consisting essentially of lanthanum oxide, cerium oxide and at least one alkaline earth metal oxide, said perovskite double oxide being carried on the surface of said catalyst support; and
    a noble metal catalyst component carried on the surface of said catalyst support.

2. A catalyst for purifying exhaust gases according to claim 1, wherein
    an alumina layer is formed on the catalyst support, and perovskite double oxide and noble metal catalyst component are formed and disposed in said alumina layer.

3. A catalyst for purifying exhaust gases according to claim 1, wherein
    said alkaline earth metal is magnesium, calcium, strontium, or barium.

4. A catalyst for purifying exhaust gases according to claim 1, wherein
    said noble metal catalyst component comprises one or more of the elements platinum, palladium, iridium and rhodium.

5. A catalyst for purifying exhaust gases according to claim 1, wherein
    said alkaline earth metal oxide is barium oxide.

6. A catalyst for purifying exhaust gases according to claim 5, wherein
    said noble metal catalyst component is platinum and palladium.

7. A catalyst for purifying exhaust gases according to claim 1, wherein said perovskite double oxide has the chemical formula $$M_{1-x}La_xCeO_{3-\delta},$$

where M is an alkaline earth metal, ($0 < x < 1$), and $\delta$ is the oxygen deficiency amount.

8. A catalyst for purifying exhaust gases according to claim 1, wherein said perovskite double oxide has the chemical formula, $$Ba_{1-x}La_xCeO_{3-\delta}$$

wherein $0 < x < \frac{3}{4}$ and $\delta 0$ is the oxygen deficiency amount.

9. A catalyst for purifying exhaust gases according to claim 2, wherein said perovskite double oxide is present in said alumina layer in an amount of 5 to 45% by weight.

* * * * *